Oct. 14, 1952            G. C. DUDEK            2,613,699

RIPSAW TABLE HAVING A HINGED SECTION

Filed July 15, 1949            2 SHEETS—SHEET 1

INVENTOR:
GUSTAVE C. DUDEK
BY Cromwell Greist & Warden
ATTYS.

Oct. 14, 1952         G. C. DUDEK         2,613,699
RIPSAW TABLE HAVING A HINGED SECTION
Filed July 15, 1949         2 SHEETS—SHEET 2
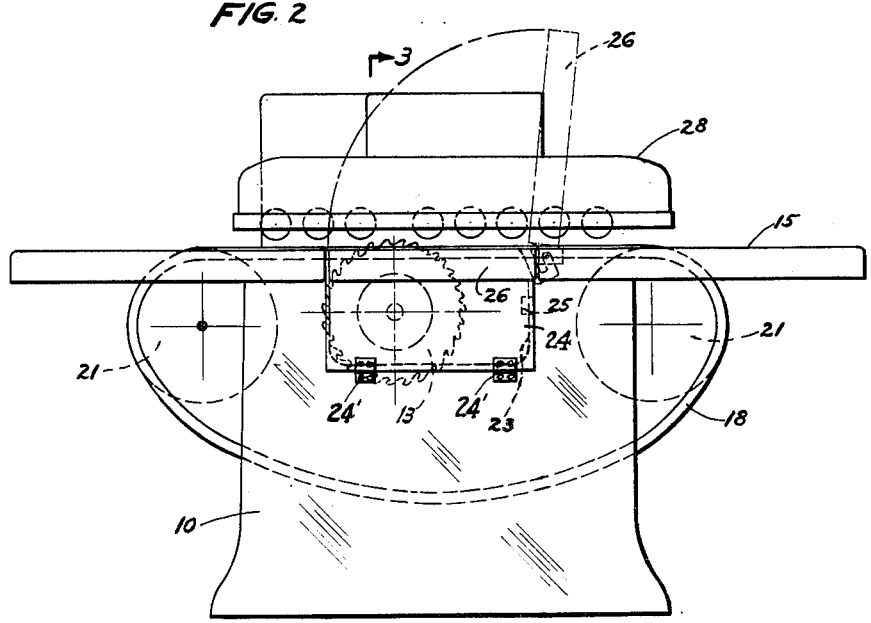
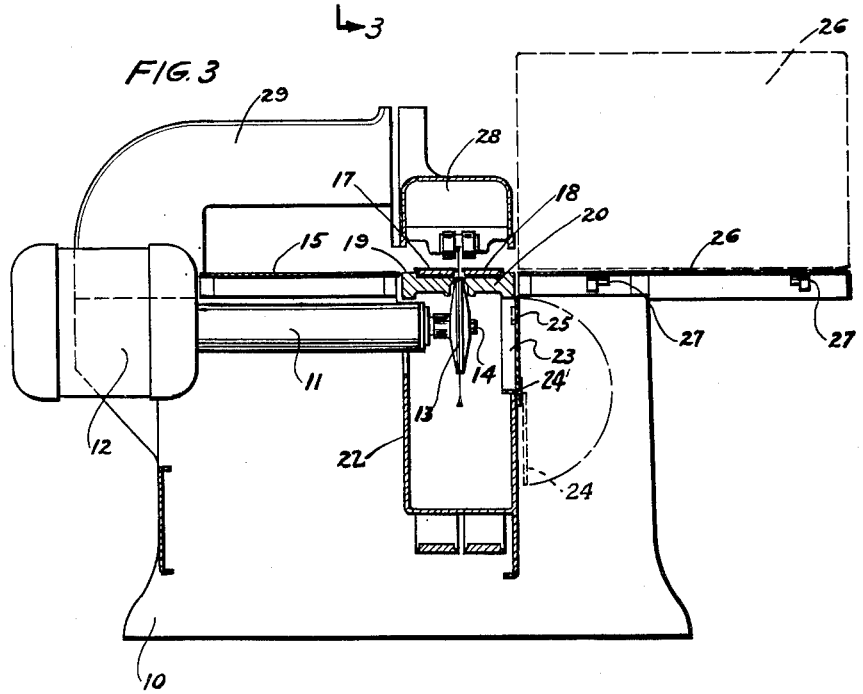
INVENTOR:
GUSTAVE C. DUDEK
BY Cromwell, Greist & Warden
ATTYS.

Patented Oct. 14, 1952

2,613,699

UNITED STATES PATENT OFFICE 2,613,699

RIPSAW TABLE HAVING A HINGED SECTION

Gustave C. Dudek, Beloit, Wis., assignor to Yates-American Machine Company, Beloit, Wis., a corporation of Delaware Application July 15, 1949, Serial No. 104,965

5 Claims. (Cl. 143—49)

This invention relates to saw table constructions and is more particularly concerned with improvements in a table construction for a traveling bed circular saw.

It is a general object of the invention to provide in a traveling bed circular saw an improved table construction whereby ready access may be had to the saw blade to permit its removal and replacement quickly and without undue labor on the part of the operator.

It is a more specific object of the invention to provide in a saw table for a circular saw of the traveling bed type a hinged gate or table section extending laterally from adjacent the blade to the outside edge of the saw table whereby a passage is provided from the side edge of the table to the saw blade which provides ready access to the blade to facilitate changing the same.

These and other objects of the invention will be apparent from a consideration of the preferred form of saw table construction which is shown by way of illustration in the accompanying drawings, wherein:

Fig. 2 is a side elevation of the saw; and

Fig. 3 is a section taken generally on line 3—3 of Fig. 2.

Figure 1:
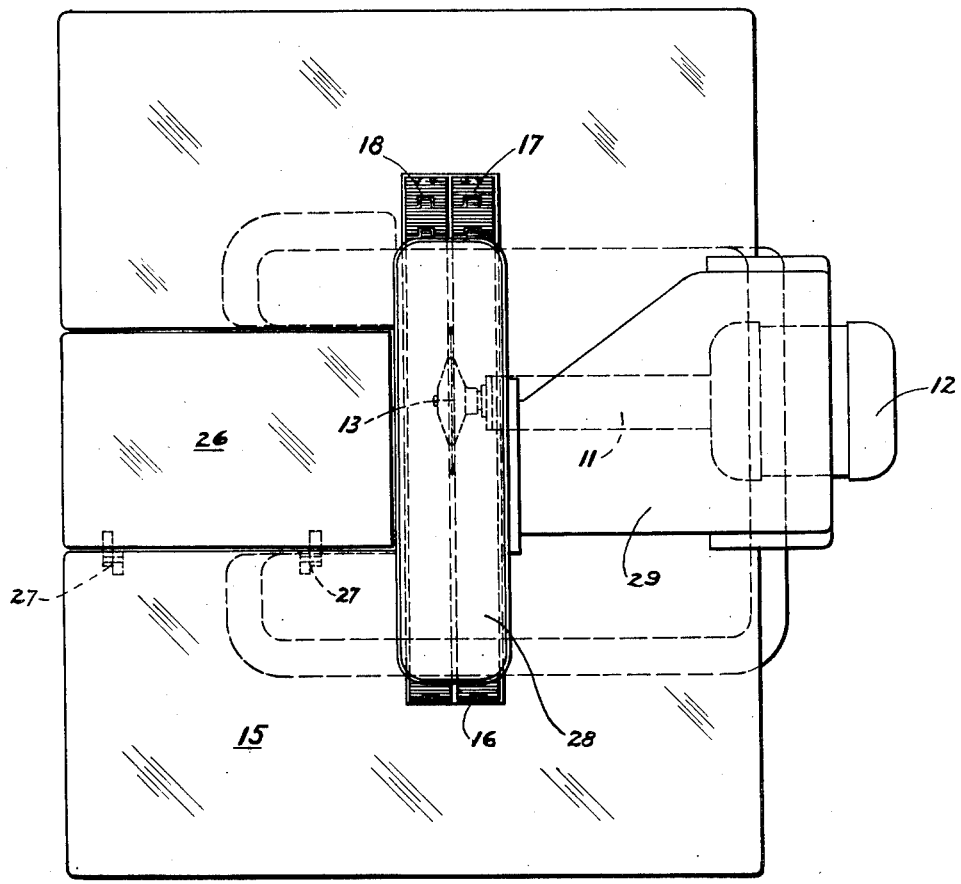
Fig. 1 is a plan view of a straight line ripsaw of the traveling bed type which embodies therein the principles of the invention, parts of the machine being shown schematically.

Referring to the drawings, there is illustrated a straight line ripsaw of the traveling bed type having a table which is constructed in accordance with the principles of the invention and which greatly facilitates replacement of the saw blade. Certain details of the illustrated saw which are not part of the invention are not shown or are shown schematically.

The saw comprises a base 10 on which there is supported an arbor 11 and a driving motor 12 which is connected in direct driving relation with the arbor 11. The saw blade 13 is removably secured on the end of the arbor 11 by a threaded nut 14. A relatively large table 15 is mounted on top of the base 10 and is provided with a longitudinally extending aperture or slot 16 which accommodates the saw blade 13 and also a pair of parallel inner and outer endless traveling bed or feed chain members 17 and 18. The slot 16 extends a substantial distance both forwardly and rearwardly of the saw blade 13, the saw table 15 being relatively long with its forward and rearward edges spaced a considerable distance from the saw blade 13. The feed chain members 17 and 18 are supported along opposite sides of the blade by fixed inner and outer guideway forming members 19 and 20, respectively. The guideway members 19 and 20 are laterally spaced a sufficient distance to accommodate the saw blade 13 between them. The traveling bed members or feed chains 17 and 18 are mounted on sprockets indicated at 21 which are operated by suitable drive means (not shown). The saw blade 13 extends into a well 22 around which the traveling bed members 17 and 18 move.

An opening 23 is provided in the wall of the well 22 at the outer side of the machine opposite the saw blade 13. The opening 23 is preferably provided with a cover plate 24 which is mounted by means of hinges 24' for swinging movement outwardly of the opening 23. Suitable latch means, indicated at 25, is provided for holding cover 24 in closed position. The cover plate 24 is adapted to be released upon operation of the latch 25 to swing downward into an out of the way position as indicated in dotted line in Fig. 3.

Immediately above the aperture 23 in the well 22 a hinged gate 26 of substantial width is provided in the table 15. The gate 26 is hinged at 27 so that it may be raised to the position shown in dotted line in Figs. 2 and 3. The hinges 27 are of a well known type and are located beneath the table 15 so that they permit the gate 26 to be moved past dead center and to engage the hinged edge firmly on the top of the table 15 whereby to remain in the open position by force of gravity. The gate or table section 26 extends inwardly to the supporting guideway member 20 for the outer traveling bed member 18. It is arranged to clear the hold down device or roller housing 28 which is adjustably positioned above the traveling chain bed members 17 and 18 and supported on the cantilever arm 29.

The gate 26 in the table 15 is arranged to provide an unobstructed passageway of substantial width from the outside edge of the table top 15 to the outer guideway 20 thereby providing ready access to the nut 14 and the saw blade 13 so that the operator can quickly and efficiently remove the saw blade for replacement. The passageway permits the operator to readily see what he is doing when he desires to remove the saw blade 13 without requiring him to assume an awkward position beneath the table.

While specific details of construction have been referred to in the device illustrated, it will be understood that other details of construction may be resorted to within the spirit of the invention.

I claim:

1. A table saw comprising a base, a saw receiving compartment in said base, a saw blade rotatably mounted in said compartment, said compartment having an aperture in the outside wall opposite said saw blade, a work table mounted on said base, said work table having a longitudinally extending blade accommodating slot above said compartment and a connecting laterally extending slot of substantial width, said laterally extending slot providing a passageway from said blade accommodating slot to the longitudinal side margin of the work table and being in substantial alignment with the aperture in the side wall of said compartment, and a table section swingably mounted in said lateral slot which table section may be moved out of said slot to provide ready access to said saw blade.

2. A table saw as recited in claim 1 and a removable cover member for the aperture in the side wall of said compartment.

3. A table saw comprising a supporting base having a saw receiving compartment therein, a saw blade rotatably mounted in said compartment, said compartment having an aperture in the outside wall thereof opposite said saw blade of sufficient size to permit removal of said blade through the same, a table mounted on said base and extending on all sides of said saw blade, said table having a relatively narrow longitudinally extending aperture above said compartment and a relatively wide aperture extending laterally from adjacent said longitudinally extending aperture to the longitudinal side edge of said table, said laterally extending aperture being approximately in alignment with the aperture in the side wall of said compartment and being of substantially less width than the length of said table, a table section for closing said laterally extending aperture, and means for removably mounting said table section in said aperture, whereby ready access may be had to said saw blade for removal of the same.

4. A saw construction comprising a base, having a saw blade receiving compartment, an arbor mounted on said base, a saw blade on said arbor extending into said compartment, a table mounted on said base, said table having a longitudinally extending slot above said compartment, a pair of parallel endless feed chains mounted in said table slot on opposite sides of said saw blade, said base having an aperture in a side wall opposite said saw blade providing a side opening for said compartment, said table having a slot of substantial width extending laterally from said longitudinally extending slot to the outside longitudinal edge of said table, said laterally extending slot being above said aperture in the compartment side wall and opposite said saw blade, and a swingably mounted insert in said laterally extending slot whereby when said insert is swung to an open position there is an unobstructed passageway from the edge of the table to said longitudinally extending slot providing ready access to the saw blade between the feed chains therein.

5. A saw table comprising a base, a rotatable saw blade mounted in said base and a work table mounted on the top of said base and extending on opposite sides of said blade, said work table having a relatively narrow longitudinally extending blade receiving aperture and a laterally extending connected aperture, said laterally extending aperture being of sufficient width to permit lateral movement of said saw blade and extending in lateral alignment with said saw blade to the longitudinal side margin of the table, and a swingable table section mounted in said laterally extending aperture which table section may be swung outwardly of said aperture to provide an unobstructed side passageway extending from the longitudinal side margin of the table to said saw blade.

GUSTAVE C. DUDEK.

REFERENCES CITED

The following references are of record in the file of this patent:

UNITED STATES PATENTS

| Number | Name | Date |
| --- | --- | --- |
| 1,478,052 | Oliver | Dec. 18, 1923 |
| 1,540,388 | Crowe | June 2, 1925 |
| 1,796,369 | Hirst | Mar. 17, 1931 |
| 1,870,630 | Johnson | Aug. 9, 1932 |
| 1,922,151 | Boice et al. | Aug. 15, 1933 |
| 2,465,000 | Turner | Mar. 22, 1949 |
| 2,501,299 | Anderson | Mar. 21, 1950 |

FOREIGN PATENTS

| Number | Country | Date |
| --- | --- | --- |
| 114,349 | Australia | Dec. 4, 1941 |